(12) United States Patent
DiPietro et al.

(10) Patent No.: US 12,102,961 B2
(45) Date of Patent: Oct. 1, 2024

(54) CARBON DIOXIDE SEPARATION SYSTEM AND METHOD

(71) Applicant: AIR PRODUCTS AND CHEMICALS, INC., Allentown, PA (US)

(72) Inventors: Joseph DiPietro, Allentown, PA (US); Joseph Moate, Allentown, PA (US); Ugur Guner, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 421 days.

(21) Appl. No.: 17/763,908

(22) PCT Filed: Sep. 25, 2020

(86) PCT No.: PCT/US2020/052683
§ 371 (c)(1),
(2) Date: Mar. 25, 2022

(87) PCT Pub. No.: WO2021/062130
PCT Pub. Date: Apr. 1, 2021

(65) Prior Publication Data
US 2022/0331737 A1    Oct. 20, 2022

Related U.S. Application Data

(60) Provisional application No. 62/905,773, filed on Sep. 25, 2019.

(51) Int. Cl.
*B01D 53/22* (2006.01)
*B01D 53/26* (2006.01)
*B01D 53/62* (2006.01)

(52) U.S. Cl.
CPC .......... *B01D 53/62* (2013.01); *B01D 53/229* (2013.01); *B01D 53/268* (2013.01); *B01D 2256/22* (2013.01); *B01D 2258/01* (2013.01)

(58) Field of Classification Search
CPC .... B01D 53/62; B01D 53/229; B01D 53/268; B01D 2256/22; B01D 2258/01
See application file for complete search history.

(56) References Cited

U.S. PATENT DOCUMENTS 3,607,745 A * 9/1971 DiPietro .................. C09K 3/30
516/8
4,054,428 A * 10/1977 Foltz ...................... B01D 53/62
423/247
(Continued)

FOREIGN PATENT DOCUMENTS

CN         112937883 B  *  9/2022  ............. B64D 37/32
EP         2505948 A1    10/2012

OTHER PUBLICATIONS

Machine translation of CN-112937883-B (Year: 2022).*
(Continued)

*Primary Examiner* — Anthony R Shumate
(74) *Attorney, Agent, or Firm* — Jason M. Ploeger

(57) ABSTRACT

A process for capturing carbon dioxide in which an exhaust stream containing carbon dioxide is cooled by a plurality of stages of indirect heat exchange to produce a cooled exhaust stream, compressed over a plurality of stages of compression, and separated to produce a CO2-enriched stream and a CO2-depleted stream. The CO2-enriched stream is dehydrated by contacting the CO2-enriched stream with a regenerated desiccant to produce a CO2 product stream and a spent desiccant. The CO2-depleted stream is heated by indirect heat exchange against the exhaust stream to produce a hot CO2-depleted stream, while a portion of the CO2-depleted stream is extracted from an interstage of the plurality of stages of indirect heat exchange to regenerate the spent desiccant. The hot CO2-depleted stream is expanded over a plurality of stages of expansion to drive the com-
(Continued)

pression of the cooled exhaust, thereby producing an expanded CO2-depleted stream.

12 Claims, 5 Drawing Sheets

(56) References Cited

U.S. PATENT DOCUMENTS

| 11,512,402 | B2* | 11/2022 | Bairamijamal | C07C 41/01 |
| 2011/0068585 | A1* | 3/2011 | Dube | B01D 53/1475 |
| | | | | 60/407 |
| 2011/0138852 | A1* | 6/2011 | Hasse | F25J 3/067 |
| | | | | 62/617 |
| 2011/0239700 | A1* | 10/2011 | Hasse | F23J 15/06 |
| | | | | 62/617 |
| 2012/0042689 | A1* | 2/2012 | Bresler | B01D 53/261 |
| | | | | 95/114 |
| 2012/0272657 | A1* | 11/2012 | Baker | F01K 5/00 |
| | | | | 60/772 |
| 2015/0005703 | A1* | 1/2015 | Hutchinson | A61M 5/14 |
| | | | | 604/95.01 |
| 2016/0084051 | A1* | 3/2016 | Vinegar | C09K 8/845 |
| | | | | 166/302 |
| 2017/0350650 | A1 | 12/2017 | Hofer et al. | |
| 2017/0368499 | A1* | 12/2017 | Hofer | B01D 53/226 |
| 2020/0009494 | A1* | 1/2020 | Ritter | B01D 53/047 |

OTHER PUBLICATIONS

Li Zhao et al: Investigation of the Cooling System of a Membrane-based Post-combustion Process, Energy Procedia, vol. 114, Jul. 1, 2017 (Jul. 1, 2017), pp. 666-685.
European International Search Report and Written Opinion of the International Searching Authority, mailed Feb. 5, 2021, for PCT/US20/52683.

* cited by examiner

CARBON DIOXIDE SEPARATION SYSTEM AND METHOD

CROSS-REFERENCE TO RELATED APPLICATIONS

The present application claims priority to U.S. Provisional Application No. 62/905,773 filed on Sep. 25, 2019, which is incorporated herein by reference in its entirety.

BACKGROUND

The present disclosure relates generally to reducing emissions from exhaust streams containing carbon dioxide and, more specifically, to systems and methods of reducing emissions by recovering carbon dioxide from an exhaust gas stream using a turboexpander and membrane.

Power generating processes that are based on combustion of carbon-containing fuel produce carbon dioxide as a byproduct. Typically, the carbon dioxide is one component of a mixture of gases that results from, or passes unchanged through, the combustion process. It may be desirable to capture or otherwise remove the carbon dioxide and other components of the gas mixture to prevent the release of the carbon dioxide and other components into the environment or to use the carbon dioxide for industrial purposes.

At least one known method for removing carbon dioxide from exhaust gas streams includes a carbon dioxide membrane that selectively removes carbon dioxide from exhaust gas streams. The process typically requires compression and cooling of the exhaust gas stream. However, energy consumption per unit of carbon dioxide in the process can be quite high, due in large part to the need to cool and compress the exhaust gas stream. In addition, downstream utilization of the carbon dioxide product typically requires dehydration, another energy intensive separation. There is a need for a process with significant heat integration to deliver a dehydrated carbon dioxide product at the lowest energy cost.

SUMMARY

Disclosed is a method for initiating separation of carbon dioxide from a fluid stream. The method is particularly suited for separating carbon dioxide from the exhaust gas streams produced by internal combustion engines. As such, the method entails operating at least one hydrocarbon burning engine and passing exhaust gases from said hydrocarbon burning engine to a multi-stage heat exchanger. The multi-stage heat exchanger has a shell and finned tube configuration. The method monitors the temperature of the exhaust gases entering the shell portion of the multi-stage heat exchanger. The gases pass through the shell portion of each stage of said multi-stage heat exchanger and subsequently pass out of the multi-stage heat exchanger. After exiting the multi-stage heat exchanger, the gases are returned to the finned tube portion side of at least one stage of said multi-stage heat exchanger. After passing out of said finned tube portion of said multi-stage heat exchanger, the gases are vented to the atmosphere. The method also monitors the temperature of the exhaust gases passing out of said finned tube portion of said multi-stage heat exchanger. Once the gases passing out of the finned tube portion of the multi-stage heat exchanger are at a temperature of about 80% of the monitored temperature of the gases entering the shell portion of the multi-stage heat exchanger, the gas exiting the shell portion will no longer be returned to the multi-stage heat exchanger. Rather, the gas exiting the shell portion of the multi-stage heat exchanger will eventually be passed to carbon dioxide separation unit.

Aspect 1: A process for capturing carbon dioxide, the process comprising cooling an exhaust stream containing carbon dioxide by a plurality of stages of indirect heat exchange to produce a cooled exhaust stream; compressing the cooled exhaust stream over a plurality of stages of compression to produce a compressed exhaust stream; separating the compressed exhaust stream to produce a CO2-enriched stream and a CO2-depleted stream; dehydrating the CO2-enriched stream by contacting the CO2-enriched stream with a regenerated desiccant to produce a CO2 product stream and a spent desiccant; heating the CO2-depleted stream by a plurality of stages of indirect heat exchange against the exhaust stream to produce a hot CO2-depleted stream; extracting a portion of the CO2-depleted stream from an interstage of the plurality of stages of indirect heat exchange to produce a warm CO2-depleted stream; contacting the warm CO2-depleted stream with the spent desiccant to produce a moist CO2-depleted stream and the regenerated desiccant; expanding the hot CO2-depleted stream over a plurality of stages of expansion to drive the compression of the cooled exhaust, thereby producing an expanded CO2-depleted stream; and feeding the moist CO2-depleted stream to an interstage of the plurality of stages of expansion.

Aspect 2: A process according to Aspect 1, further comprising feeding a first fraction of the moist CO2-depleted stream and a second fraction of the moist CO2-depleted fraction to different interstages of the plurality of stages of expansion.

Aspect 3: A process according to Aspect 1 or Aspect 2, wherein the temperature of the warm CO2-depleted stream is between 450 and 550 degrees F. (232-288 degrees C.).

Aspect 4: A process according to any of Aspects 1 to 3, further comprising adding a water stream to the CO2-depleted stream at an interstage of the plurality of stages of indirect heat exchange.

Aspect 5: A process according to Aspect 4, further comprising heating the water stream prior to adding the water stream to the CO2-depleted water stream.

Aspect 6: A process according to any of Aspects 1 to 5, further comprising when the difference between the temperature of the exhaust stream and the temperature of a vent stream is less than 100 degrees F. (37 degrees C.), diverting the cooled exhaust stream to be heated in the plurality of stages of indirect heat exchange against the exhaust stream, in place of the CO2-depleted stream, to produce a vent stream; and ceasing diverting of the cooled exhaust stream when the difference between the temperature of the exhaust stream and the temperature of the vent stream is equal to or greater than 100 degrees F. (37 degrees C.).

Aspect 7: A process according to Aspect 6, further comprising adding a diluent gas to the exhaust gas prior to cooling by a plurality of stages of indirect heat exchange.

Aspect 8: An apparatus for capturing carbon dioxide, the apparatus comprising a heat exchanger system configured to exchange heat between an exhaust stream containing carbon dioxide and a CO2-depleted stream to produce a cooled exhaust stream, a warm CO2-depleted stream and a hot CO2-depleted stream; the heat exchange system having a hot side inlet for receiving the exhaust stream, a hot side outlet configured for delivering the cooled exhaust stream, a cold side inlet configured for receiving the CO2-depleted stream, a cold side outlet configured for delivering the hot CO2-depleted stream, and a cold side interstage outlet for delivering the warm CO2-depleted stream; a turboexpander system comprising a plurality of compressor stages in series having a first compressor stage in fluid flow communication with the hot side outlet of the heat exchanger system, the plurality of compressor stages being configured and arranged to compress the cooled exhaust stream from the hot side outlet of the heat exchanger and to produce a compressed exhaust stream; and a plurality of turbine stages in series having a first turbine stage in fluid flow communication with the cold side outlet of the heat exchanger system, each turbine stage mechanically coupled to a respective compressor stage of the plurality of compressor stages to enable the turbine stages to drive the compressor stages, the plurality of turbine stages being configured and arranged to expand the hot CO2-depleted stream from the cold side outlet of the heat exchanger system and to produce an expanded CO2-depleted stream; a carbon dioxide separation system in fluid flow communication with the plurality of compressor stages, the carbon dioxide separation system being configured and arranged to separate the compressed exhaust stream from the plurality of compressor stages and to produce a CO2-enriched stream and a CO2-depleted stream; a dehydration system in fluid flow communication with the carbon dioxide separation system and configured and arranged to contact the CO2-enriched stream with a regenerated desiccant to produce a CO2 product and a spent desiccant, the dehydration system further being in fluid flow communication with the cold side interstage outlet of the heat exchanger system and configured and arranged to contact the warm CO2-depleted stream with the spent desiccant to produce a moist CO2-depleted stream and a regenerated desiccant; wherein a first intermediate turbine stage is in fluid flow communication with the dehydration system and is configured to expand at least a portion of the moist CO2-depleted stream.

Aspect 9: An apparatus according to Aspect 8, wherein a second intermediate turbine stage is in fluid flow communication with the dehydration system and is configured to expand at least a portion of the moist CO2-depleted stream.

Aspect 10: An apparatus according to Aspect 8 or Aspect 9, the heat exchange system further having a cold side interstage inlet for receiving a water stream.

Aspect 11: A process for capturing carbon dioxide, the process comprising cooling an exhaust stream comprising carbon dioxide by a plurality of stages of indirect heat exchange to produce a cooled exhaust stream; during a startup mode circulating the cooled exhaust stream to be heated in the plurality of stages of indirect heat exchange against the exhaust stream to produce a vent stream; and switching to an operating mode when a difference between the temperature of the exhaust stream and the temperature of the vent stream is equal to or greater than 100 degrees F. (37 degrees C.); during the operating mode compressing the cooled exhaust stream over a plurality of stages of compression to produce a compressed exhaust stream; separating the compressed exhaust stream to produce a CO2-enriched stream and a CO2-depleted stream; dehydrating the CO2-enriched stream by contacting the CO2-enriched stream with a regenerated desiccant to produce a CO2 product stream and a spent desiccant; heating the CO2-depleted stream by a plurality of stages of indirect heat exchange against the exhaust stream to produce a hot CO2-depleted stream; extracting a portion of the CO2-depleted stream from an interstage of the plurality of stages of indirect heat exchange to produce a warm CO2-depleted stream; contacting the warm CO2-depleted stream with the spent desiccant to produce a moist CO2-depleted stream and the regenerated desiccant; expanding the hot CO2-depleted stream over a plurality of stages of expansion to drive the compression of the cooled exhaust, thereby producing an expanded CO2-depleted stream; and feeding the moist CO2-depleted stream to an interstage of the plurality of stages of expansion.

Aspect 12: A method of initiating separation of carbon dioxide from a fluid stream comprising operating at least one hydrocarbon burning engine; passing exhaust gases from said hydrocarbon burning engine to a multi-stage heat exchanger, said multi-stage heat exchanger having a shell and finned tube configuration; monitoring the temperature of the exhaust gases entering the shell portion of the multistage heat exchanger; passing the exhaust gases through the shell portion of each stage of said multi-stage heat exchanger; passing the exhaust gases out said shell portion of said multi-stage heat exchanger; returning the exhaust gases to at least one finned tube portion stage of said multi-stage heat exchanger; passing the exhaust gases out of said finned tube portion of said multi-stage heat exchanger and venting said exhaust gases to the atmosphere; monitoring the temperature of the exhaust gases passing out of said finned tube portion of said multi-stage heat exchanger; stopping the return of the exhaust gases to the finned tube portion of said multi-stage heat exchanger when the monitored temperature of the exhaust gases passing out of the finned tube portion of the multi-stage heat exchanger is within about 80% of the temperature of the monitored temperature of the gases entering the shell portion of the multi-stage heat exchanger; and, after stopping the return of the exhaust gases to the finned tube portion of the multi-stage heat exchanger, passing the exhaust gases out of the shell portion of the multi-stage heat exchanger to a carbon dioxide separation unit.

BRIEF DESCRIPTION OF THE DRAWINGS

The present invention will hereinafter be described in conjunction with the appended figures wherein like numerals denote like elements.

DETAILED DESCRIPTION

Figure 1:
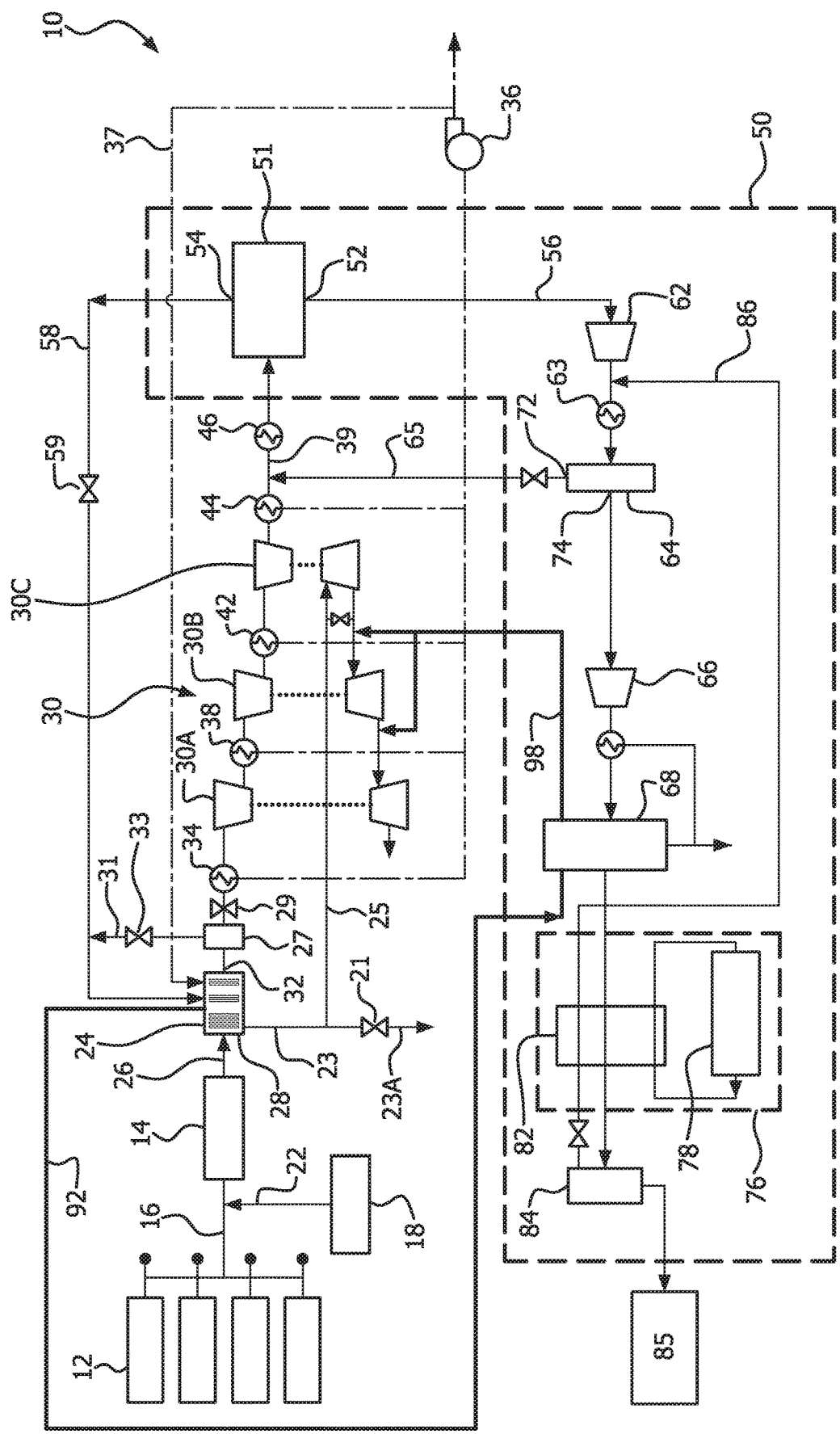
FIG. 1 is a flowsheet schematic depicting an embodiment of a carbon dioxide separation process.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

This disclosure provides a system 10 for capturing carbon dioxide from a gaseous exhaust stream. The source of the exhaust stream may be any process that concentrates carbon dioxide in the exhaust stream relative to the atmospheric composition. In one embodiment, system 10 captures exhaust gas containing carbon dioxide ($CO_2$) from one or more internal combustion engines 12. The exhaust system of each engine 12 conveys exhaust gases to a catalyst housing 14 via conduit or pipe 16. Catalyst housing 14 contains a catalyst selected for its ability to reduce the oxygen ($O_2$) concentration within the exhaust gas. Any of the known catalysts capable of reducing $O_2$ concentration may be used in catalyst housing 14. One particularly suitable catalyst is palladium. The catalyst may be a fixed bed, supported catalyst or other configuration. A methane supply 18 is located upstream of catalyst housing 14. Methane supply is in fluid communication with pipe 16 or catalyst housing 14 via conduit or pipe 22. Downstream and in fluid communication with catalyst housing 14 is a multi-stage heat exchanger 24. Suitable heat exchangers include but are not limited to: plate fin, shell and tube, plate and frame and finned tube.

In one embodiment, multi-stage heat exchanger 24 is a finned tube heat exchanger having at least two stages. At a minimum, multi-stage heat exchanger 24 has a sufficient number of stages to reduce an incoming exhaust gas stream from a temperature ranging from about 1000 degrees F. to about 1200 degrees F. (537-648 degrees C.) at heat exchanger inlet 26 to a temperature between about 140 degrees F. to about 240 degrees F. (60-115 degrees C.) at outlet port 32. Generally, multi-stage heat exchanger 24 will reduce the hot exhaust gas temperature to a temperature compatible with the next downstream component. Typically, multi-stage heat exchanger 24 will reduce exhaust gas temperature to a temperature between about 160 degrees F. and about 220 degrees F. (71-104 degrees C.).

Figure 2:
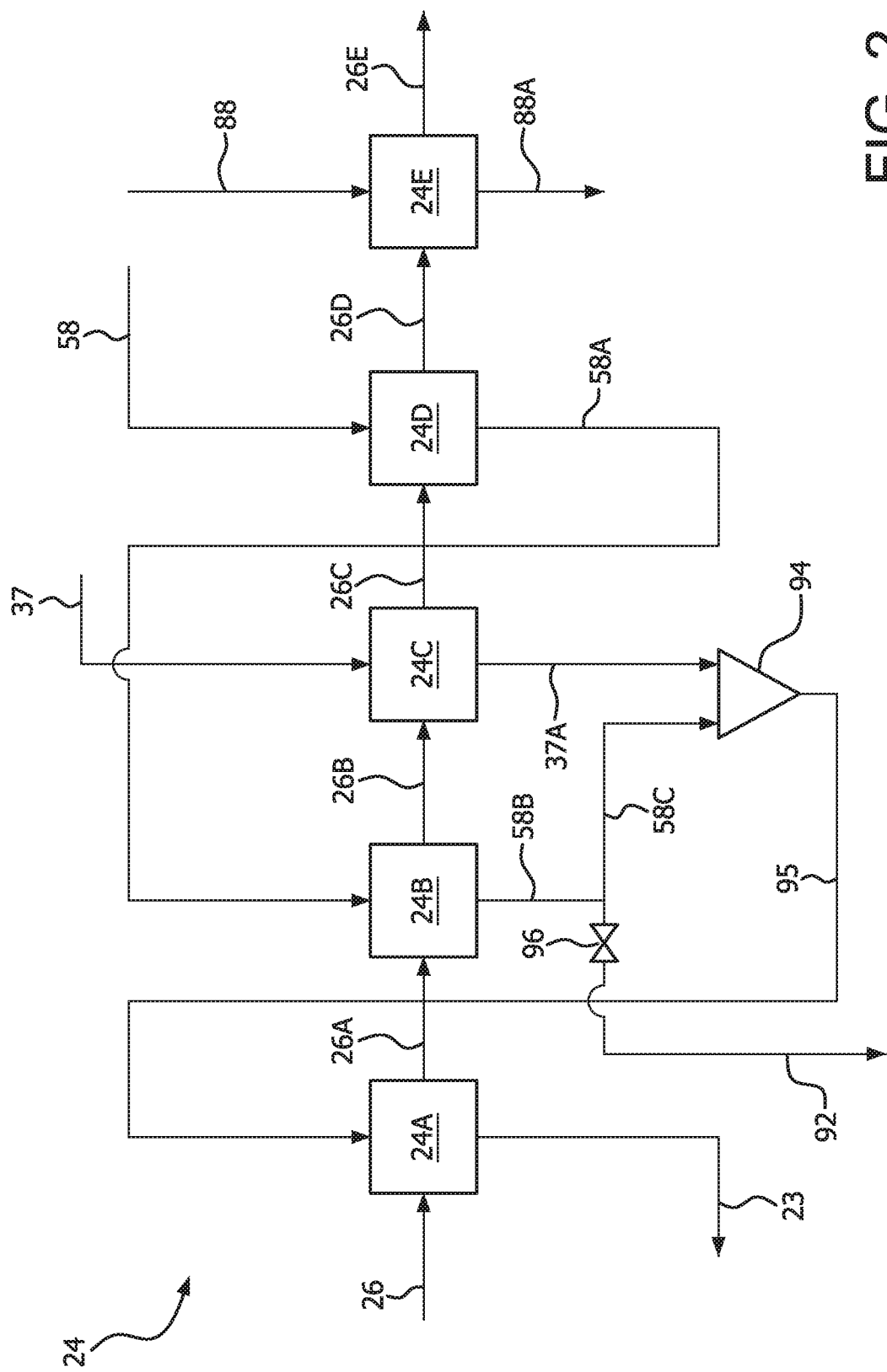
FIG. 2 is a flowsheet schematic depicting the heat exchanger system in the process of FIG. 1.

Multi-stage heat exchanger 24 is depicted in FIG. 2. As depicted therein, multi-stage heat exchanger 24 has five stages 24A-E. As configured, hot exhaust gas passes through the shell portion of multi-stage heat exchanger 24. Thus, the configuration of multi-stage heat exchanger 24 transfers heat from gas passing through the shell portion to fluids passing through the finned tube portion.

Multi-stage heat exchanger 24 serves a plurality of roles during the operation and startup of system 10. As will be discussed below, for startup purposes, multi-stage heat exchanger 24 acts as a thermal battery. Additionally, multi-stage heat exchanger 24 provides thermal input to fluids passing through the finned tube portion. Stages 24A-E convey thermal energy from the exhaust gas passing through the shell portion of each stage to the finned tube portion and the fluid passing through the finned tube portions.

System 10 includes at least one and preferably a plurality of turbochargers 30. As known to those skilled in the art, each turbocharger has a compression side and an expansion side in which expanding gases on the expansion side drive the compression side. While the number of turbochargers may vary, system 10 will be described with reference to three turbochargers 30a-c with 30a referred to herein as first turbocharger 30a, 30b referred to as second turbocharger 30b and 30c referred to herein as third turbocharger 30c.

Multi-stage heat exchanger 24 has outlet ports 28 and 32. Outlet port 28 is in fluid communication with the expansion side of third turbocharger 30c via conduits 23 and 25 when valve 21 is closed. Outlet port 32 provides fluid communication to blower 27, valve 29 and a second heat exchanger 34. Second heat exchanger 34 is in fluid communication with compression side of first turbocharger 30a and pump 36. The compression side of first turbocharger 30a is in fluid communication with a third heat exchanger 38. Third heat exchanger 38 is in fluid communication with pump 36 and the compression side of second turbocharger 30b. The compression side of second turbocharger 30b is in fluid communication with a fourth heat exchanger 42. Fourth heat exchanger 42 is in fluid communication with pump 36 and third turbocharger 30c. The compression side of third turbocharger 30c is in fluid communication with a fifth heat exchanger 44 and a sixth heat exchanger 46. Immediately downstream of heat exchangers 34, 38, 42 and 44 are gas/liquid separation units (not shown). Heat exchangers 34, 38, 42 and 44 along with the gas/liquid separation units may be housed within a single vessel or configured separately from one another. The heat exchanger portions of vessels 34, 38 and 42 reduce the temperature of the exhaust gas prior to entering the next downstream processing component. Heat exchanger 44 will typically be a water/gas exchanger which cools the gas to a temperature between about 85 degrees F. and 100 degrees F. (29-37 degrees C.), more typically between about 90 degrees F. and 95 degrees F. (32-35 degrees C.). Heat exchanger 46 adds sufficient heat to the gas stream such that the gas has a temperature of about 10 degrees F. (−12 degrees C.) above the gas's saturation temperature. Thus, heat exchanger 46 adds about 10 degrees F. (−12 degrees C.) of superheat to the gas. In this manner, heat exchangers 34, 38, 42, 44 and 46 provide the exhaust gas to the $CO_2$ separation unit 51 at a desired temperature suitable for processing the gas within separation unit 51 as determined by the selected $CO_2$ separation material. At least a portion of the rejected water by the gas/liquid separators downstream of heat exchangers 34, 38, 42 and 44 is subsequently circulated by pump 36 to multi-stage heat exchanger 24 where the reject water aids in increasing the mass of the passing to the expander side of third turbocharger 30c.

$CO_2$ collection sub-system 50 includes $CO_2$ separation unit 51. Sub-system 50 is configured to provide $CO_2$ product having a purity of about 90%. Sub-system 50 also houses a $CO_2$ collection material capable of selectively isolating $CO_2$ from a gaseous stream. Any $CO_2$ selective material known to those skilled in the art such as a series of polymer membranes which selectively allows for the permeation of $CO_2$ will perform satisfactorily in system 10. Other materials known to those skilled in the art include solid sorbents, solid adsorbents, solid surface adsorbents, functionalized zeolites, amine and physical solvents and activated carbon. Separation unit 51 receives exhaust gases from the compression side of turbocharger 30c. Typically, the exhaust gases will be at a temperature between about 50 degrees F. and about 115 degrees F. (10-46 degrees C.). This final temperature is achieved by the addition of heat to the exhaust gases by heat exchanger 46 which as discussed above is configured to provide sufficient thermal energy to add 10 degrees F. (−12 degrees C.) of superheat to the exhaust gases. Separation unit 51 has two outlets 52, 54. Outlet 54 is in fluid communication via conduit 58 with the finned tube side of stage 24d of multi-stage heat exchanger 24.

$CO_2$ collection sub-system 50 may also include a first compressor 62 which receives a $CO_2$-enriched stream from $CO_2$ separation unit 51 and a second $CO_2$ separation unit 64 in fluid flow communication with the first compressor 62. The $CO_2$-enriched stream from compressor 62 passes through a heat exchanger 63 into second $CO_2$ separation unit 64. Second $CO_2$ separation unit 64 further separates $CO_2$ from the gaseous stream. Second $CO_2$ separation unit 64 has two outlet ports 72 and 74. First outlet port 72 returns the $CO_2$-depleted stream from second $CO_2$ separation unit 64 to first separation unit 51 for further processing via conduits 65 and 39. Second outlet port 74 is in fluid communication with a second compressor 66. Second compressor 66 compresses the CO2-enriched stream and is in fluid communication with a dehydration unit 68. Dehydration unit 68 contains a desiccant selected for its ability to remove water from the gaseous CO2 stream. The dessicant may be a liquid such as triethylene glycol (TEG) or an adsorbent such as molecular sieve. Dehydration unit 68 is in fluid communication with a cryogenic unit 76. Cryogenic unit 76 is configured to reduce the temperature of the purified CO2 product to a temperature sufficient to liquefy the purified CO2. Typically, refrigeration unit 78 will maintain heat exchanger 82 at operational temperatures between about −10 degrees F. and −30 degrees F. (−23--−34 degrees C.). Cryogenic unit 76 is in fluid communication with a collection system appropriate for collecting the compressed and cooled CO2 product. As depicted in FIG. 1, cryogenic unit 76 is in fluid communication with a gas/liquid separator 84. Gas separated from the liquid CO2 product 85 is returned to second CO2 separation unit 64 via conduit 86 after first passing through heat exchanger 82.

As noted above, the exhaust gas from engines 12 passes through the shell portion of multi-stage heat exchanger 24. As the hot gases pass through the shell portion thermal energy is conveyed to the finned tube portions of heat exchanger 24. Different fluids may pass through the finned tube portions of stages 24A-E in order to optimize the heat integration of the overall system. As depicted in FIG. 1, rejected water from exchangers 34, 38, 42, 44 and 46 passes through conduit 37 into multi-stage heat exchanger 24. As depicted in FIG. 2, the rejected water passes into the finned tube portion of stage 24c. Additionally, the CO2-depleted gas from separation unit 51 flows through conduit 58 to multi-stage heat exchanger 24. As depicted in FIG. 2, the CO2-depleted gas passes into the finned tube portion of stage 24D. Flow of cold water through conduit 88 through final finned tube stage 24e reduces the temperature of the exhaust gases to a value appropriate for use in blower 27. Typically, the exhaust gas leaving outlet port 32 will be at a temperature between about 140 degrees F. and about 180 degrees F. (60-82 degrees C.). More typically, the exhaust gas will be about 160 degrees F. (71 degrees C.) prior to entering blower 27.

During operation of system 10, CO2-depleted gases pass through conduit 58 to the finned tube portion of stage 24D. The gases are heated within stage 24d and subsequently pass to stage 24B where they are further heated. Likewise, the reject water that has passed through stage 24C has been heated to a temperature of about 375° F. This hot water is injected into the hot dry gas exiting stage 24B via a nozzle 94. The combined fluid stream then passes to stage 24A where the combined fluid stream is further heated to a temperature between about 900 degrees F. and 1200 degrees F. (482-648 degrees C.). The heated moist gas stream then passes through conduits 23 and 25 to the expansion side of third turbocharger 30C. Additionally, as depicted in FIG. 2, a portion of the dry heated gas that has passed through both finned tube portions of stages 24D and 24B is available for use in regenerating dehydration unit 68. Flow of the dry heated gas from stage 24B to dehydration unit 68 through conduit 92 is controlled by valve 96. The regeneration of dehydration unit 68 is discussed in more detail below.

The configuration of system 10 is particularly suited for reducing the time necessary to initiate operation of system 10. As depicted in FIG. 1, a blower 27 and valves 29, 33 are located immediately downstream of multi-stage heat exchanger 24. Conduit 31 and valve 33 control fluid communication between blower 27 and conduit 58. Valves 29 and 59 isolate turbochargers 30a-c and CO2 collection sub-system 50 and other components from blower 27. Thus, when valve 33 is open and valves 29 and 59 are closed, exhaust gases from engines 12 are drawn by blower 27 through the shell side of multi-stage heat exchanger 24 and passed to the finned tube side of stages 24A, 24B and 24C before being vented through valve 21 and outlet port 23A. The hot gases from blower 27 exit from multi-stage heat exchanger 24 through conduit 23 and outlet port 23A provided that valve 21 is open. Conduit 23 and outlet port 23A have lengths sufficient to ensure selective passage of the hot gases through valve 21 without driving the expansion side of third turbocharger 30C during startup of system 10.

Figure 3:
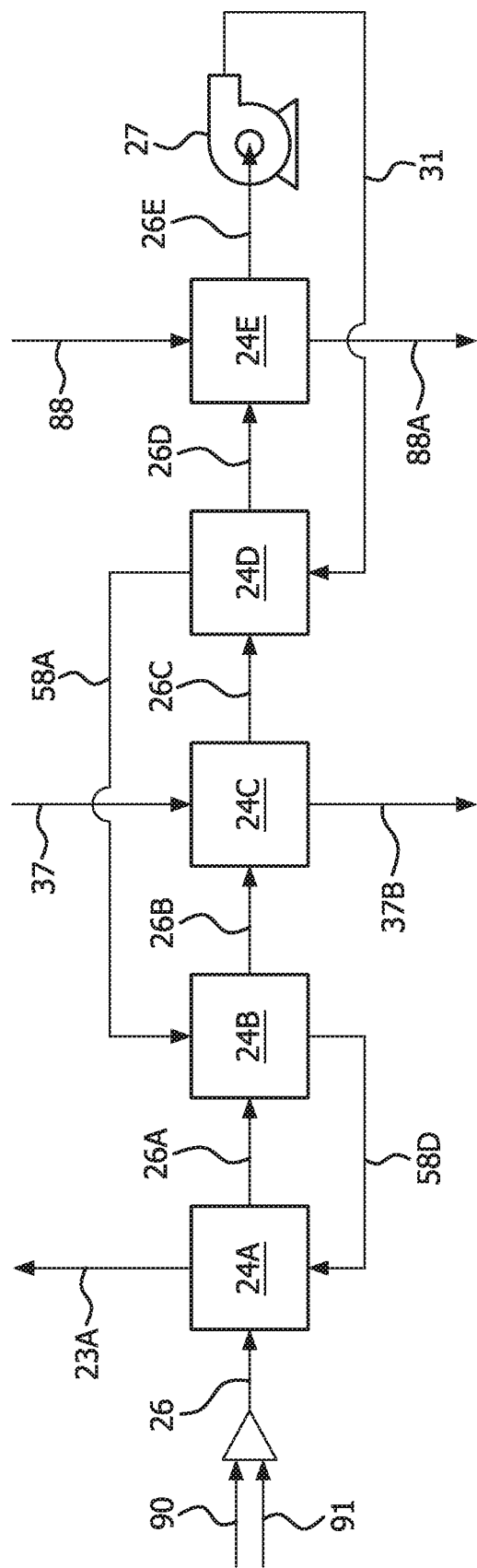
FIG. 3 is a flowsheet schematic depicting an embodiment of a carbon dioxide separation process startup in which the heat exchanger system is preheated with the exhaust.

One embodiment of the operation of the heat exchanger 24 during the startup method is shown in FIG. 3. Once again the case discussed herein is one where the heat exchanger 24 is a shell and tube heat exchanger. The start up method for system 10 utilizes multi-stage heat exchanger 24 as a heat or thermal battery. Prior to initiating operation of turbochargers 30A-C and CO2 collection sub-system 50, multi-stage heat exchanger 24 is pre-heated. The start-up method begins with the operation of engines 12. FIG. 3 shows that a conduit 90 carrying exhaust may be mixed with air delivered by a conduit 91 to control the temperature and reduce the risk of overtemperature in the heat exchanger during start up.

Referring to FIG. 1, with valves 29 and 59 closed and valves 21 and 33 open, exhaust gases from heat exchanger inlet 26 initially pass through multi-stage heat exchanger 24 in the same way as normal operation as shown in FIG. 2. However, in this valve configuration, the exhaust gases do not pass to the compression side of turbochargers 30a-c during startup of system 10.

After the exhaust gases exit multi-stage heat exchanger 24, they pass through blower 27. Blower 27 provides sufficient discharge pressure to enable the gases to flow through conduits 31 and 58 into the finned tube side of multi-stage heat exchanger 24, in this case into stage 24D.

Additionally, operation of blower 27 generates sufficient compression of the gases to provide for an increase in gas temperature and pressure in conduit 31. Typically, during startup operations gases passing through conduit 31 will be at a pressure between about 14 psia to about 18 psia and a temperature between about 360 degrees F. and about 400 degrees F. (182-204 degrees C.). More typically, the gases exiting blower 27 and passing through conduit 31 will be at a pressure between about 15 psia and to about 17 psia and a temperature between about 370 degrees F. and about 390 degrees F. (187-198 degrees C.).

Upon entering the finned tube side of multi-stage heat exchanger 24, the gases follow the path normally occupied by the CO2-depleted gas from separation unit 51. Thus, the compressed exhaust gases pass through the finned tube portions of stages 24D, 24B and finally 24A of FIG. 3. During the start-up method, process water is not added to the exhaust gases. Rather, the exhaust gases exit multi-stage heat exchanger 24 through conduit 23, valve 21, and may be vented to the atmosphere via outlet port 23A The recycle of exhaust gases through blower 27 and multi-stage heat exchanger 24 continues until the gas flowing out of port 28 of multi-stage heat exchanger 24 has achieved a targeted temperature. Generally, the targeted temperature approaches that of the gas flowing into multi-stage heat exchanger 24 via heat exchanger inlet 26. Typically, the temperature difference between the gas flowing out of port 28 and into heat exchanger inlet 26 will be within 50°

F. to 100° F. (10-37 degrees C. The length of time required to reach the target temperature will vary depending on the number of engines 12 and size/type of heat exchanger 24. During startup of system 10, use of methane injection (from methane supply 18) will be optional. Additionally, during startup operations, process water may still flow through stage 24C if cooling is needed. This water may be discharged to waste and cold water may flow through stage 24e to ensure the temperature of the gas flowing out of port 32 is cooled if necessary.

Upon achievement of targeted temperature, valves 29 and 59 will open followed immediately by closing of valves 21 and 33. This manipulation of valves 21, 29, 33 and 59 directs the flow of hot gases from stage 24a through conduits 23 and 25 to the expansion side of third turbocharger 30C. The recirculation of hot exhaust gases through multi-stage heat exchanger 24 increases the operational temperature of multi-stage heat exchanger 24 such that upon initiation of normal fluid flow through system 10, the gases exiting multi-stage heat exchanger 24 are at or nearly at the desired temperature prior to entering turbochargers 30A-C. Thus, the recirculation of hot gases through multi-stage heat exchanger 24 reduces the time required for the turbochargers 30A-C to achieve operational temperature and operational rotational speed. As a result, this start-up method precludes or at least minimizes oil loss from the bearings of turbochargers 30A-C and improves the operational life of turbochargers 30A-C.

With reference to FIG. 3, typical operating conditions during the startup procedure will be described. The startup operating conditions of temperature, pressure and flow rates will vary from unit to unit for system 10 with variables such as sub-unit capacity and the number of turbochargers 30 as well as the number of stages in multi-stage heat exchanger 24 influencing the actual operational conditions. Therefore, the following operational conditions are merely exemplary of one embodiment of conditions during the startup method.

Hot exhaust gas from engines 12 will enter multi-stage heat exchanger 24 at temperatures generally between about 800 degrees F. and 1200 degrees F. (426-648 degrees C.). The engine exhaust gases will generally flow under a pressure between about 13 psia and about 15 psia at flow rates between about 2200 pound/hour to about 30000 pound/hour. Temperature of the exhaust gas drops as it passes through each stage (24a-e) of multi-stage heat exchanger 24. After passing through stage 24A, exhaust gas temperature will generally be between about 500 degrees F. and 700 degrees F. (260-371 degrees C.) and after stage 24B exhaust gas temperature will generally be between about 250 degrees F. and 450 degrees F. (121-232 degrees C.). Following stage 24C, exhaust gas temperature will generally be between about 200 degrees F. and 400 degrees F. (93-204 degrees C.) and after stage 24D, exhaust gas temperature will generally be between about 260 degrees F. and 450 degrees F. (126-232 degrees C.). Note, the increase in exhaust gas temperature after stage 24D results from recirculation of gas from blower 27 through the finned tube side of stage 24D. Finally, exhaust gas exits stage 24E at a temperature between about 100 degrees F. and 220 degrees F. (37-104 degrees C.) and enters blower 27 at pressure between about 13 psia and about 15 psia. The reduction in exhaust gas temperature exiting stage 24E is due to the passage of cold water through the finned tube side of stage 24E. As noted above, operation of blower 27 increases the temperature and pressure of the exhaust gas prior to entering the finned tube side of stage 24D and flowing to the finned tube side of stages 24B and 24A. The recirculated exhaust gas enters stage 24D at a pressure between about 15 psia and 17 psia and a temperature between about 360 degrees F. and 400 degrees F. (182-204 degrees C.). Upon exiting the finned tube side of stage 24D, the gas is at pressure between about 15 psia and 17 psia and a temperature between about 250 degrees F. and 350 degrees F. (121-176 degrees C.). The gas subsequently passes through the finned tube side of stages 24B and 24A. Upon exiting stage 24B, the gas has a pressure between about 14.5 psia and 16.5 psia and a temperature between about 500° F. and 600° F. (260-315 degrees C.). Upon exiting stage 24A, the gas has a pressure between about 13 psia and about 15 psia, a temperature between about 900 degrees F. and 1000 degrees F. (482-537 degrees C.) at a flow rate between about 2200 pound/hour and about 2600 pound/hour. Thus, the recirculation provides for pre-heating of multi-stage heat exchanger 24 prior to initiating normal operations as described above.

Figure 4:
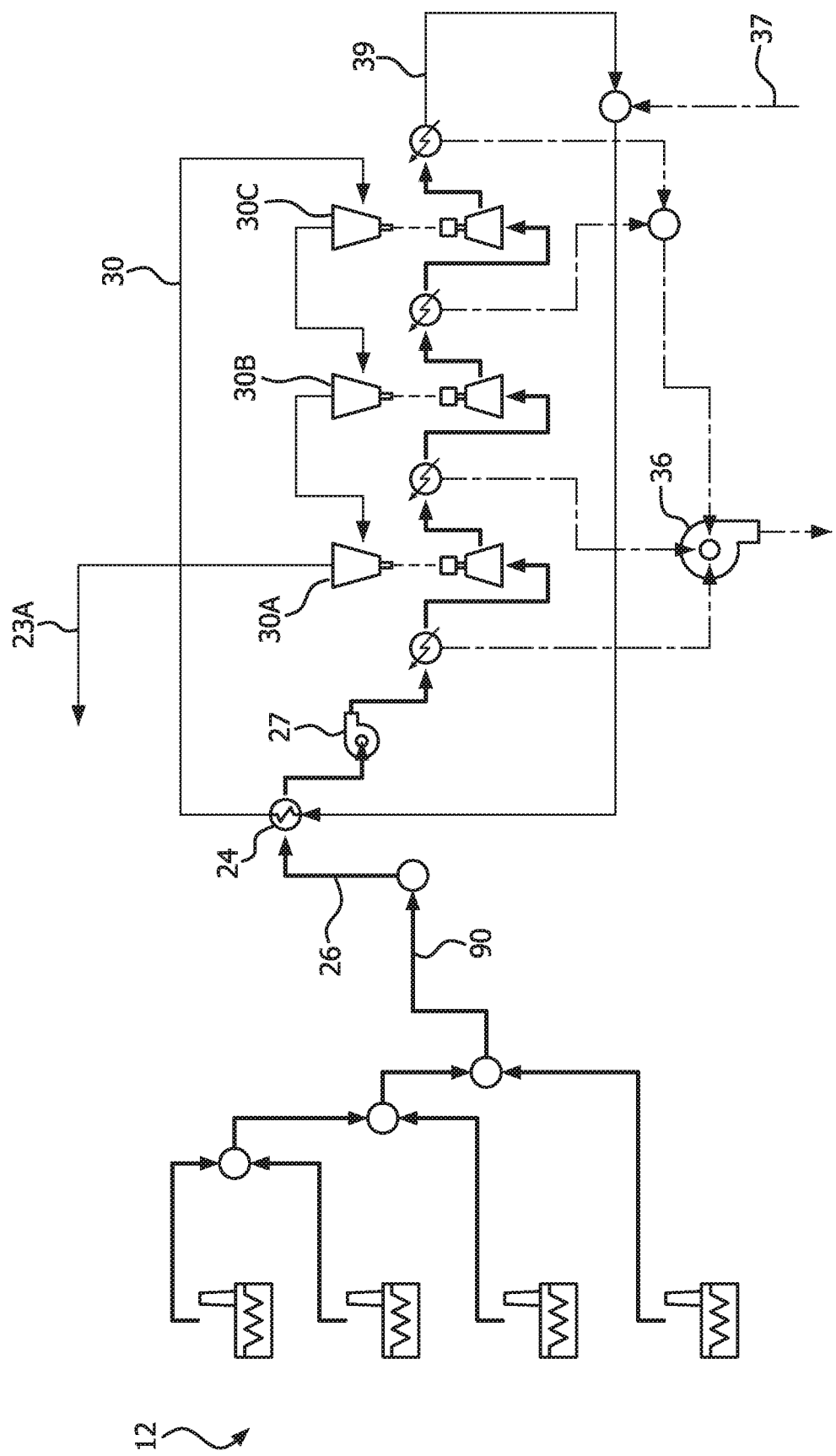
FIG. 4 is a flowsheet schematic depicting an embodiment of a carbon dioxide separation process startup showing how the turbochargers are fully loaded prior to the startup of the CO2 separation system.

An intermediate stage in the start up method is shown in FIG. 4. Once the heat exchanger 24 has been preheated, the turbochargers 30 may be started up. The CO2 separation unit 51 may be started up after the turbochargers for ease of operation. First, the introduction of air via conduit 91 to prevent overtemperature in the heat exchanger 24 is no longer needed. FIG. 4 shows the cooled exhaust via blower 27 being compressed in the compressor side of the turbochargers 30. The cooled exhaust may then be returned via conduit 39 to the heat exchanger cold side to be heated and expanded in the expander side of the turbochargers 30. The cooled exhaust may be combined with water via conduit 37. After the turbochargers are at operational temperature and rotational speed, the CO2 separation unit 51 may be started up once the feed conditions are determined to be correct. One potential advantage for this intermediate stage in the start up method would be for CO2 separation systems with a poor tolerance for trace compressor oil, such as semipermeable membranes.

The configuration of system 10 also provides an improved method for regenerating dehydration unit 68. Although depicted as a single unit, system 10 will comprise multiple vessels, for example in the case of adsorption, one or more dehydration units are on stream while one or more dehydration units are being regenerated, and units are switched between dehydration and regeneration in a batch process. In the case of a liquid solvent dehydration unit such as TEG, rich solvent is pumped from the dehydration unit to the regeneration unit in a continuous process. After a given period of time, dehydration unit becomes saturated with water and will no longer sufficiently dry the stream of CO2.

Normally, a separate heat source is required for regeneration of dehydration unit 68. However, system 10 takes advantage of heat captured by multi-stage heat exchanger 24 to provide for regeneration of dehydration unit 68. This heat can be delivered from the hot CO2-depleted stream leaving the heat exchanger 24 or a warm CO2-depleted stream taken from any of the interstages of heat exchanger 24. In the case shown in FIGS. 1 and 2, dry gas from the finned tube portion of stage 24Bb passes through valve 96 and conduit 92 to dehydration unit 68. Dry gas from stage 24B will typically be at a temperature between about 450 degrees F. and 550 degrees F. (232-287 degrees C.) and a pressure between about 100 psi and about 300 psi. More typically, dry gas from stage 24B will be at a temperature between about 480 degrees F. and 520 degrees F. (248-271 degrees C.) and a pressure between about 150 psi and about 200 psi.

Gas flow from stage 24B to dehydration unit 68 continues for a period of time sufficient to regenerate the desiccant in dehydration unit 68. The time period required for regeneration will vary depending on the type of desiccant used and the size of dehydration unit 68. The method for regenerating dehydration unit 68 also contributes to the operation of turbochargers 30A and 30B. The gas stream exiting dehydration unit 68 has picked up moisture during the regeneration process. As a result, the gas stream exiting dehydration unit 68 is similar to the moist gas stream exiting stage 24A of multi-stage heat exchanger 24. Thus, during regeneration operations, energy contained within gas exiting dehydration unit 68 can be used to drive the expansion side of turbocharger 30Bb or 30A. Accordingly, the moist gas from dehydration unit 68 passes through conduit 98 to expander side of turbocharger 30B or 30A. Provided that the gas stream exiting dehydration unit 68 has a temperature and pressure greater than the temperature and pressure of the primary gas stream entering the expander side of turbocharger 30B or 30A, the gas from dehydration unit 68 will be able to contribute to the driving force of turbocharger 30B or 30A. Typically, the pressure drop that the warm $CO_2$-depleted gas would suffer in the regeneration process would result in a loss of power delivered to the turbochargers, but the additional mass from the water vapor mitigates this loss.

Figure 5:
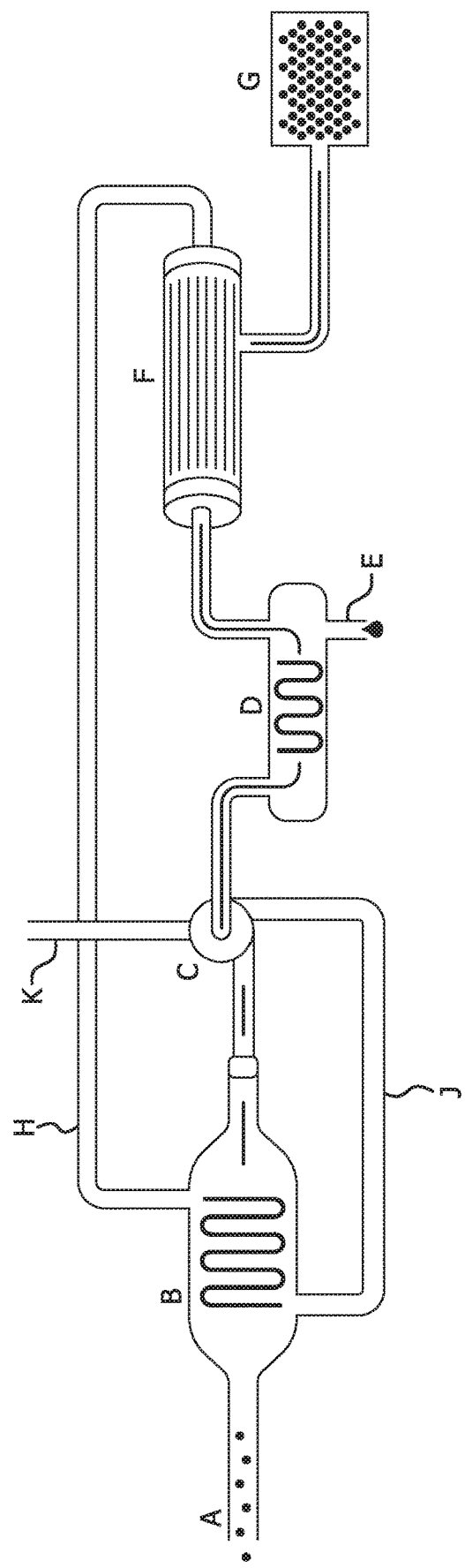
FIG. 5 is a flowsheet schematic overview depicting an embodiment of a carbon dioxide separation process in which the carbon dioxide separation system is a glassy polymeric membrane.

FIG. 5 illustrates the overall process for clarity, in which the $CO_2$ separation system is a glassy polymeric membrane. A $CO_2$-containing exhaust stream A enters the hot side of a heat exchanger B and is cooled down before entering the compressor side of a turbocharger C. The compressed exhaust must be cooled using cooling water in a heat exchanger D to protect the membrane from the high temperatures. The heat exchanger D also condenses some of the water from the compressed exhaust which leaves the heat exchanger as stream E and can be recycled in the process. The compressed exhaust then enters a membrane F in which the higher solubility of $CO_2$ in the polymeric material causes it to permeate preferentially over $N_2$. A $CO_2$-enriched permeate stream can then be further polished, dehydrated, sequestered in an underground formation, or utilized as a chemical feedstock or for enhanced oil recovery as desired in a downstream process G. A $CO_2$-depleted non-permeate stream H is still at high pressure after suffering only a small pressure drop in the membrane, so after entering the cold side of the heat exchanger B, the heated $CO_2$-depleted non-permeate stream J can be used to drive the expander side of the turbocharger C in the same manner that a combustion products stream might be used in a typical turbocharger application. The difference compared to a typical turbocharger application is that a vent stream K in the present application is primarily $N_2$.

Other embodiments of the present invention will be apparent to one skilled in the art. As such, the foregoing description merely enables and describes the general uses and methods of the present invention. Accordingly, the following claims define the true scope of the present invention.

Example 1

Exhaust from multiple engines as shown in FIG. 1 enters the detailed illustration of the heat exchanger 24 as shown in FIG. 2. The cooled exhaust leaves the heat exchanger 24, is compressed in the plurality of turbochargers 30, separated in $CO_2$ separation unit 51, and the $CO_2$-depleted stream (conduit 58) is fed to the cold side of the heat exchanger 24 in stage 24D. A portion of the warm $CO_2$-depleted stream 58B may be withdrawn via valve 96 to conduit 92 to be used to regenerate the dessicant, and the remainder is mixed with heated water stream 37A. The resulting stream is heated further in stage 24A to form a hot $CO_2$-depleted stream which is then fed to the expander side of the plurality of turbochargers 30 via conduit 23.

The heat and material balance is shown below in Table 1. The amount of water added in the water stream (via conduit 37) improves the performance of the expanders by adding mass, but it is preferred to limit the amount such that the combined stream 95 is single phase, for example 5-30 degrees F. (−15−−1 degrees C.) above the saturation temperature. In Example 1, stream 95 is 7 degrees F. (−13 degrees C.) above the saturation temperature.

TABLE 1

| Stream | 26 | 26A | 26B | 26C | 26D | 26E | 88 | 88A |
|---|---|---|---|---|---|---|---|---|
| Mass flow (lb/hr) | 35975 | 35975 | 35975 | 35975 | 35975 | 35975 | 19480 | 19480 |
| T (F.) | 1175 | 547 | 414 | 352 | 215 | 160 | 84 | 112 |
| P (psia) | 14.17 | 14.17 | 14.17 | 14.17 | 14.17 | 14.17 | 34 | 34 |
| CO2 mol % | 11.5 | 11.5 | 11.5 | 11.5 | 11.5 | 11.5 | 0 | 0 |
| N2 mol % | 68.89 | 68.89 | 68.89 | 68.89 | 68.89 | 68.89 | 0 | 0 |
| O2 mol % | 19.52 | 19.52 | 19.52 | 19.52 | 19.52 | 19.52 | 0 | 0 |
| H2O mol % | 0.078 | 0.078 | 0.078 | 0.078 | 0.078 | 0.078 | 100 | 100 |

| Stream | 58 | 58A | 58B | 37 | 37A | 95 | 23 |
|---|---|---|---|---|---|---|---|
| Mass flow (lb/hr) | 26500 | 26500 | 26500 | 2143 | 2143 | 28643 | 28643 |
| T (F.) | 94.4 | 297.7 | 498 | 90.2 | 375 | 237 | 1075.6 |
| P (psia) | 185 | 178.6 | 173.35 | 226 | 226 | 173.35 | 159 |
| CO2 mol % | 14.23 | 14.23 | 14.23 | 0 | 0 | 12.533 | 12.533 |
| N2 mol % | 85.23 | 85.23 | 85.23 | 0 | 0 | 75.04 | 75.04 |
| O2 mol % | 0.1 | 0.1 | 0.1 | 0 | 0 | 0.085 | 0.085 |
| H2O mol % | 0.44 | 0.44 | 0.44 | 100 | 100 | 12.342 | 12.342 |

| HX | Duty (MMbtu/h) |
|---|---|
| 24A | 6.675 |
| 24B | 1.34 |
| 24C | 0.62 |
| 24D | 1.34 |
| 24E | 0.535 |

Example 2

Exhaust from multiple engines from conduit 90 is combined ambient temperature air from conduit 91 and enters the detailed illustration of the heat exchanger system 24 via conduit 26 in the startup method as shown in FIG. 3. With valves 29 and 59 closed and valves 21 and 33 open in FIG. 1, the cooled exhaust is returned to the cold side of the heat exchanger 24 via conduit 31 into stage 24D. The cooled exhaust then is heated in stage 24B and stage 24A before venting via outlet port 23A. Stage 24E is cooled with cooling water and stage 24C is cooled with process water.

The heat and material balance is shown below in Table 2. The start up method is a transient process in which as the heat exchanger material heats up, the exit temperature in 23A will approach the entrance temperature in 26. The time snapshot in Table 2 shows a temperature difference of 47 degrees F. (8 degrees C.), indicating that the heat exchanger has been successfully preheated.

TABLE 2

| Stream | 26 | 26A | 26B | 26C | 26D | 26E |
|---|---|---|---|---|---|---|
| Mass flow (lb/hr) | 2400 | 2400 | 2400 | 2400 | 2400 | 2400 |
| T (F.) | 1000 | 590 | 360 | 290 | 358 | 160 |
| P (psia) | 14.2 | 14.2 | 14.2 | 14.2 | 14.2 | 14.2 |

| Stream | 31 | 58A | 58D | 23A | 88 | 88A | 37 | 37B |
|---|---|---|---|---|---|---|---|---|
| Mass flow (lb/hr) | 2400 | 2400 | 2400 | 2400 | 5560 | 5560 | 200 | 200 |
| T (F.) | 380 | 311 | 541 | 954 | 86 | 110 | 86 | 320 |
| P (psia) | 16.3 | 15.8 | 15.4 | 14.1 | 30 | 30 | 250 | 250 |

While the principles of the invention have been described above in connection with preferred embodiments, it is to be clearly understood that this description is made only by way of example and not as a limitation of the scope of the invention.

The invention claimed is:

1. A process for capturing carbon dioxide, the process comprising:
    cooling an exhaust stream containing carbon dioxide by a plurality of stages of indirect heat exchange to produce a cooled exhaust stream;
    compressing the cooled exhaust stream over a plurality of stages of compression to produce a compressed exhaust stream;
    separating the compressed exhaust stream to produce a CO2-enriched stream and a CO2-depleted stream;
    dehydrating the CO2-enriched stream by contacting the CO2-enriched stream with a regenerated desiccant to produce a CO2 product stream and a spent desiccant;
    heating the CO2-depleted stream by a plurality of stages of indirect heat exchange against the exhaust stream to produce a hot CO2-depleted stream;
    extracting a portion of the CO2-depleted stream from an interstage of the plurality of stages of indirect heat exchange to produce a warm CO2-depleted stream;
    contacting the warm CO2-depleted stream with the spent desiccant to produce a moist CO2-depleted stream and the regenerated desiccant;
    expanding the hot CO2-depleted stream over a plurality of stages of expansion to drive the compression of the cooled exhaust, thereby producing an expanded CO2-depleted stream; and
    feeding the moist CO2-depleted stream to an interstage of the plurality of stages of expansion.

2. The process of claim 1, further comprising feeding a first fraction of the moist CO2-depleted stream and a second fraction of the moist CO2-depleted fraction to different interstages of the plurality of stages of expansion.

3. The process of claim 1, wherein the temperature of the warm CO2-depleted stream is between 450 and 550 degrees F. (232-287 degrees C.).

4. The process of claim 1, further comprising adding a water stream to the CO2-depleted stream at an interstage of the plurality of stages of indirect heat exchange.

5. The process of claim 4, further comprising heating the water stream prior to adding the water stream to the CO2-depleted water stream.

6. The process of claim 1, further comprising:
    when the difference between the temperature of the exhaust stream and the temperature of a vent stream is less than 100 degrees F. (37 degrees C.), diverting the cooled exhaust stream to be heated in the plurality of stages of indirect heat exchange against the exhaust stream, in place of the CO2-depleted stream, to produce a vent stream; and
    ceasing diverting of the cooled exhaust stream when the difference between the temperature of the exhaust stream and the temperature of the vent stream is equal to or greater than 100 degrees F. (37 degrees C.).

7. The process of claim 6, further comprising:
    adding a diluent gas to the exhaust stream prior to cooling by a plurality of stages of indirect heat exchange.

8. An apparatus for capturing carbon dioxide, the apparatus comprising:
    a heat exchanger system configured to exchange heat between an exhaust stream containing carbon dioxide and a CO2-depleted stream to produce a cooled exhaust stream, a warm CO2-depleted stream and a hot CO2-depleted stream;
    the heat exchange system having a hot side inlet for receiving the exhaust stream, a hot side outlet configured for delivering the cooled exhaust stream, a cold side inlet configured for receiving the CO2-depleted stream, a cold side outlet configured for delivering the hot CO2-depleted stream, and a cold side interstage outlet for delivering the warm CO2-depleted stream;
    a turboexpander system comprising:
        a plurality of compressor stages in series having a first compressor stage in fluid flow communication with the hot side outlet of the heat exchanger system, the plurality of compressor stages being configured and arranged to compress the cooled exhaust stream from the hot side outlet of the heat exchanger and to produce a compressed exhaust stream; and
        a plurality of turbine stages in series having a first turbine stage in fluid flow communication with the cold side outlet of the heat exchanger system, each turbine stage mechanically coupled to a respective compressor stage of the plurality of compressor stages to enable the turbine stages to drive the compressor stages, the plurality of turbine stages being configured and arranged to expand the hot CO2-depleted stream from the cold side outlet of the heat exchanger system and to produce an expanded CO2-depleted stream;

a carbon dioxide separation system in fluid flow communication with the plurality of compressor stages, the carbon dioxide separation system being configured and arranged to separate the compressed exhaust stream from the plurality of compressor stages and to produce a CO2-enriched stream and a CO2-depleted stream;

a dehydration system in fluid flow communication with the carbon dioxide separation system and configured and arranged to contact the CO2-enriched stream with a regenerated desiccant to produce a CO2 product and a spent desiccant, the dehydration system further being in fluid flow communication with the cold side interstage outlet of the heat exchanger system and configured and arranged to contact the warm CO2-depleted stream with the spent desiccant to produce a moist CO2-depleted stream and a regenerated desiccant;

wherein a first intermediate turbine stage is in fluid flow communication with the dehydration system and is configured to expand at least a portion of the moist CO2-depleted stream.

9. The apparatus of claim 8, wherein a second intermediate turbine stage is in fluid flow communication with the dehydration system and is configured to expand at least a portion of the moist CO2-depleted stream.

10. The apparatus of claim 8, the heat exchange system further having a cold side interstage inlet for receiving a water stream.

11. A process for capturing carbon dioxide, the process comprising:
cooling an exhaust stream comprising carbon dioxide by a plurality of stages of indirect heat exchange to produce a cooled exhaust stream;
during a startup mode:
circulating the cooled exhaust stream to be heated in the plurality of stages of indirect heat exchange against the exhaust stream to produce a vent stream; and
switching to an operating mode when a difference between the temperature of the exhaust stream and the temperature of the vent stream is equal to or greater than 100 degrees F. (37 degrees C.);
during the operating mode:
compressing the cooled exhaust stream over a plurality of stages of compression to produce a compressed exhaust stream;
separating the compressed exhaust stream to produce a CO2-enriched stream and a CO2-depleted stream;
dehydrating the CO2-enriched stream by contacting the CO2-enriched stream with a regenerated desiccant to produce a CO2 product stream and a spent desiccant;
heating the CO2-depleted stream by a plurality of stages of indirect heat exchange against the exhaust stream to produce a hot CO2-depleted stream;
extracting a portion of the CO2-depleted stream from an interstage of the plurality of stages of indirect heat exchange to produce a warm CO2-depleted stream;
contacting the warm CO2-depleted stream with the spent desiccant to produce a moist CO2-depleted stream and the regenerated desiccant;
expanding the hot CO2-depleted stream over a plurality of stages of expansion to drive the compression of the cooled exhaust, thereby producing an expanded CO2-depleted stream; and
feeding the moist CO2-depleted stream to an interstage of the plurality of stages of expansion.

12. A method of initiating separation of carbon dioxide from a fluid stream comprising:
operating at least one hydrocarbon burning engine;
passing exhaust gases from said hydrocarbon burning engine to a multi-stage heat exchanger, said multi-stage heat exchanger having a shell and finned tube configuration;
monitoring the temperature of the exhaust gases entering a shell portion of the multistage heat exchanger;
passing the exhaust gases through the shell portion of each stage of said multi-stage heat exchanger;
passing the exhaust gases out said shell portion of said multi-stage heat exchanger;
returning the exhaust gases to at least one finned tube portion stage of said multi-stage heat exchanger;
passing the exhaust gases out of said finned tube portion of said multi-stage heat exchanger and venting said exhaust gases to the atmosphere;
monitoring the temperature of the exhaust gases passing out of said finned tube portion of said multi-stage heat exchanger;
stopping the return of the exhaust gases to the finned tube portion of said multi-stage heat exchanger when the monitored temperature of the exhaust gases passing out of the finned tube portion of the multi-stage heat exchanger is within about 80% of the temperature of the monitored temperature of the gases entering the shell portion of the multi-stage heat exchanger; and
after stopping the return of the exhaust gases to the finned tube portion of the multi-stage heat exchanger, passing the exhaust gases out of the shell portion of the multi-stage heat exchanger to a carbon dioxide separation unit.

* * * * *